E. F. WEBB.
APPARATUS FOR THINNING PLANTS.
APPLICATION FILED JULY 21, 1909.
957,131.
Patented May 3, 1910.
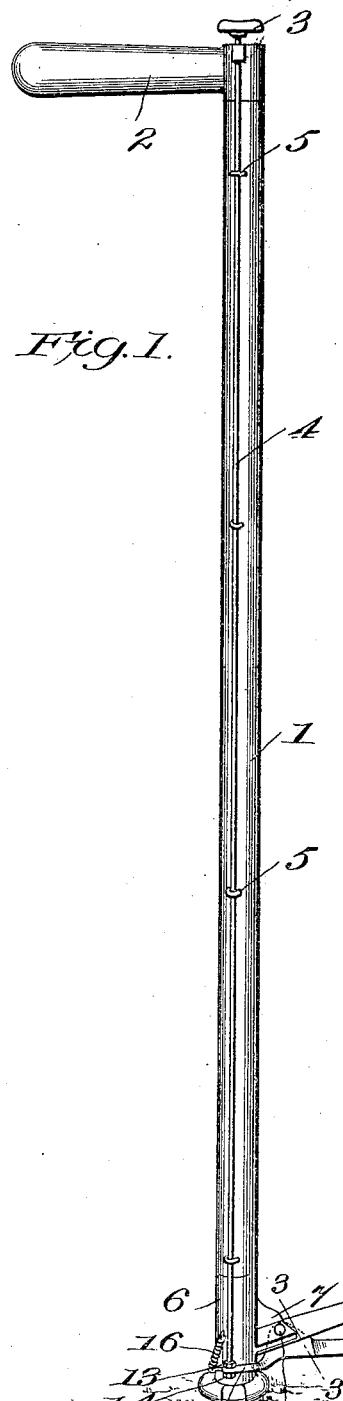
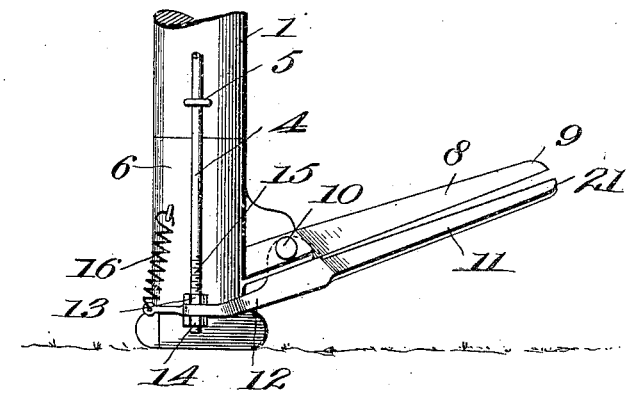
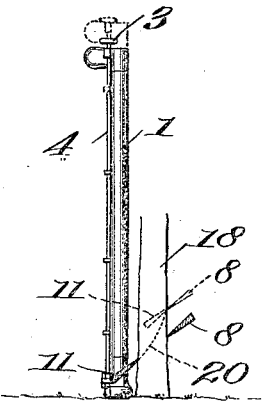
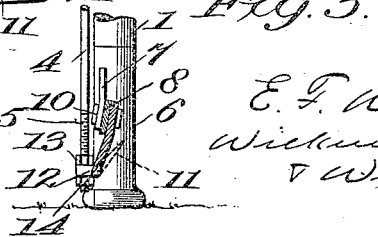

UNITED STATES PATENT OFFICE.

EMMET F. WEBB, OF OSYKA, MISSISSIPPI.

APPARATUS FOR THINNING PLANTS.

957,131. Specification of Letters Patent. Patented May 3, 1910.

Application filed July 21, 1909. Serial No. 508,705.

*To all whom it may concern:*

Be it known that I, EMMET F. WEBB, a citizen of the United States, residing at Osyka, in the county of Pike and State of Mississippi, have invented certain new and useful Improvements in Apparatus for Thinning Plants; and I do hereby declare the following to be a full, clear, and exact description of the invention, such as will enable others skilled in the art to which it appertains to make and use the same.

This invention relates to an apparatus for thinning cotton and other plants, and has for its object the production of a simple and comparatively inexpensive device for accomplishing this purpose.

With these and other objects in view the invention consists in the novel details of construction and combinations of parts more fully hereinafter disclosed and particularly pointed out in the claims.

Referring to the accompanying drawings forming a part of this specification in which like numerals refer to like parts in all the views:—Figure 1 is a side elevational view of the complete device; Fig. 2, a detail view of the lower portion of the device; Fig. 3, a partially sectional view of the part shown in Fig. 1 taken on the line 3—3, and Fig. 4, a diagrammatic view showing the operation of the device upon an exaggerated scale.

1 represents any suitable standard provided with a suitable handle 2; 3 a push button or other movable part; 4 a rod attached to said button and provided with suitable guides 5.

At the end of the standard 1, opposite the handle 2, is secured a sleeve 6 provided with a lug 7 to which is rigidly attached a guard 8 having a sharp edge 9. Through the lug 7 and guard 8 passes a pivot 10, preferably at an angle to the standard 1, as clearly shown in Fig. 3. Pivoted on the part 10 is a cutting blade 11 provided with a rear extension 12 to which the lower end of the rod 4 is secured in any suitable manner, as by the nuts 13 and 14 fitting the screw threaded end 15 of said rod 4. Also attached to the sleeve 6, or standard 1, is the spring 16, the lower end of which is attached to the outer extremity of the extension 12, as best illustrated in Fig. 2. This spring normally keeps the cutting blade 11 opened out from the stationary guard 8, as illustrated, but when the push button 3 is depressed the blade 11 will close on the guard 8, as best illustrated in Fig. 1. It is preferred to incline the guard 8 from the horizontal, as shown, and also incline the plane of said guard, as well as the plane of the blade 11 to the axis of the standard 1, as best shown in Fig. 4.

18 represents a stalk of cotton or other plant which it is desired to cut, and it will be observed that since the blade 11 is inclined in the two directions illustrated, that it may be manipulated to cut said plant after the manner of a pair of shears, or it may be caused to cut said plant by simply lifting the standard 1 and raising it into the dotted line position shown in Fig. 4, when the blade 11 will follow the dotted line 20 through said plant, illustrated in said Fig. 4, and without manipulating the push button 3 at all. It is likewise evident that the push button 3 may be manipulated to actuate the blade 11, while the said blade is at the same time bodily lifted to follow said dotted line 20 in Fig. 4 when the plant will be severed by a combined shear action and a sliding cutting action of the knife. It is very desirable to be able to secure this sliding cut on the plant, for that when the knife is dull or the plant is particularly tough, a shear action might not be sufficient to sever the same; besides there being much more strength in the wrist than in the thumb more power can be applied on the blade than would otherwise be the case. The inclination of the blade 11 above the horizontal also aids in this action, for that the blade not only slides upwardly through the plant along the dotted line 20 in Fig. 4, but it may be made to slide along the plant from its extreme outer end 21 toward its pivot 10 after the manner of a scythe, and thereby secure an additional cutting action.

In operation the thumb button 3 is depressed which closes the blade on its guard thus bringing the guard and blade together, whereupon they are brought near the plant it is desired to cut, and then the thumb button 3 is released. The releasing of the thumb button permits the spring 16 to open out the blade 11, when it may be brought into proper cutting relation with the plant selected and then the plant may be severed in the manner disclosed above.

I am aware that various pruning devices have heretofore been produced, some of which operate by a pushing action and some by a pulling action, but none of the same are so far as I know adapted for thinning cotton or similar growing plants, nor do any of the same so far as I am aware have the same cutting action as that above disclosed.

What I claim is:—

1. In a device for thinning plants, the combination of a standard; a transversely and upwardly inclined blade so pivoted that when it is swung open it is at substantially a right angle to the standard; a stationary blade coacting therewith and means for swinging said pivoted blade on its pivot, substantially as described.

2. In a device for thinning plants, the combination of a standard; a transversely and upwardly inclined pivoted blade; a stationary blade coacting with said pivoted blade; and means for swinging said pivoted blade on its pivot, whereby when the blades are closed the plant is severed at an oblique angle, substantially as described.

3. In a device for thinning plants, the combination of a standard; a handle therefor; a transversely and upwardly inclined pivoted blade; a stationary blade coacting with said pivoted blade; and means for swinging said pivoted blade on its pivot, whereby when the blades are brought together the plant may be severed at an oblique angle.

4. In a device for thinning plants, the combination of a standard; a handle attached thereto; a lug attached to the standard; a stationary blade rigid with the lug; a transversely and upwardly inclined blade pivoted to the lug and coacting with the stationary blade; a push button; a rod connecting said blade and push button; and a spring for normally holding said blade open away from said stationary blade, substantially as described.

5. In a device for thinning plants, the combination of a standard provided with a handle and a push button; a stationary blade, coacting with the pivoted blade and rigid with said standard and upwardly and transversely inclined with relation to the axis thereof; a blade pivoted to said stationary blade and adapted to be operated by said push button; and a connection between said push button and said blade, substantially as described.

6. In a device for thinning plants, the combination of a standard provided with a handle and a push button; a stationary blade rigid with said standard and upwardly and transversely inclined with relation to the axis thereof; a blade pivoted to said guard and likewise upwardly and transversely inclined and adapted to be operated by said push button; a spring for normally holding said blade opened out from said stationary blade; and a connection, comprising a rod, between said push button and said blade, substantially as described.

In testimony whereof, I affix my signature in presence of two witnesses.

EMMET F. WEBB.

Witnesses:
C. J. OLL,
D. A. ADAMS.